US011667173B2

(12) United States Patent
Ko et al.

(10) Patent No.: US 11,667,173 B2
(45) Date of Patent: Jun. 6, 2023

(54) AIR CONDITIONER FOR VEHICLE

(71) Applicant: Hanon Systems, Daejeon (KR)

(72) Inventors: Jae Woo Ko, Daejeon (KR); Dong Gyun Kim, Daejeon (KR); Nam Jun Lee, Daejeon (KR); Ho Lee, Daejeon (KR); Chang Soo Bae, Daejeon (KR); Jong Min Lee, Daejeon (KR); Hwan Kyu Cho, Daejeon (KR); Gyu Ik Han, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 373 days.

(21) Appl. No.: 16/811,303

(22) Filed: Mar. 6, 2020

(65) Prior Publication Data

US 2020/0282805 A1 Sep. 10, 2020

(30) Foreign Application Priority Data

Mar. 6, 2019 (KR) ........................ 10-2019-0025912

(51) Int. Cl.
*B60H 1/00* (2006.01)
*B60H 1/32* (2006.01)

(52) U.S. Cl.
CPC ....... *B60H 1/00885* (2013.01); *B60H 1/0005* (2013.01); *B60H 1/00028* (2013.01); *B60H 1/00328* (2013.01); *B60H 1/3233* (2013.01); *B60H 2001/0015* (2013.01)

(58) Field of Classification Search
CPC ........... B60H 1/00885; B60H 1/00028; B60H 1/0005; B60H 1/00328; B60H 1/3233; B60H 2001/0015

USPC ......... 165/202, 203, 204; 62/272, 285, 288, 62/290, 291
See application file for complete search history.

(56) References Cited

U.S. PATENT DOCUMENTS

| 4,888,959 | A | * | 12/1989 | Brown | ............... | B60H 1/00371 62/298 |
| 5,701,949 | A | * | 12/1997 | Yamaguchi | ........ | B60H 1/00664 237/12.3 A |
| 5,893,407 | A | * | 4/1999 | Okamoto | ............. | B60H 1/0005 237/12.3 A |
| 6,478,083 | B1 | * | 11/2002 | Nanba | .................. | B60H 1/3233 62/291 |

(Continued)

FOREIGN PATENT DOCUMENTS

| CN | 105813870 A | * | 7/2016 | ........... | B60H 1/3233 |
| CN | 107405977 A | * | 11/2017 | ........... | B60H 1/3227 |

(Continued)

*Primary Examiner* — Ljiljana V. Ciric
(74) *Attorney, Agent, or Firm* — Dickinson Wright PLLC

(57) ABSTRACT

An air conditioner for a vehicle which can block air introduced through a gap between an evaporator and an air-conditioning case and prevent condensate from overflowing toward a temperature adjusting door when condensate exceeding a drainable amount is generated. The air-conditioning case has an air passageway therein. An evaporator is disposed in the air passageway. A drain hole is disposed at a downstream side of the evaporator in an air flow direction to discharge condensate to the outside. A first baffle protrudes upwardly from a bottom surface of the air-conditioning case for preventing air from leaking between the air-conditioning case and the evaporator.

13 Claims, 13 Drawing Sheets

(56) References Cited

U.S. PATENT DOCUMENTS

| | | | | |
|---|---|---|---|---|
| 6,796,368 | B1* | 9/2004 | Saida | B60H 1/00028 62/285 |
| 6,827,141 | B2* | 12/2004 | Smith | B60H 1/00842 237/12.3 A |
| 6,857,282 | B2* | 2/2005 | Shichiken | B60H 1/3233 62/411 |
| 6,959,561 | B2* | 11/2005 | Kawada | B60H 1/00028 165/913 |
| 6,962,195 | B2* | 11/2005 | Smith | B60H 1/00857 237/12.3 A |
| 7,048,035 | B2* | 5/2006 | Farag | B60H 1/00028 165/122 |
| 7,100,675 | B2* | 9/2006 | Yamamoto | B60H 1/00528 62/291 |
| 7,377,121 | B2* | 5/2008 | Tahara | B60H 1/00028 62/244 |
| 7,407,001 | B2* | 8/2008 | Newman | B60H 1/3233 165/204 |
| 7,637,031 | B2* | 12/2009 | Salim | B60H 3/0085 34/437 |
| 7,654,307 | B2* | 2/2010 | Bhatti | B60H 1/3233 261/153 |
| 7,942,192 | B2* | 5/2011 | Yamamoto | B60H 1/00528 62/291 |
| 8,151,591 | B2* | 4/2012 | Nakamura | B60H 1/3233 62/285 |
| 8,267,155 | B2* | 9/2012 | Katsuki | B60H 1/00064 165/41 |
| 8,376,037 | B2* | 2/2013 | Nanaumi | B60H 1/00064 165/203 |
| 8,403,029 | B2* | 3/2013 | Nanaumi | B60H 1/00028 165/41 |
| 8,408,980 | B2* | 4/2013 | Nanaumi | B60H 1/00842 454/126 |
| 8,544,528 | B2* | 10/2013 | Seto | B60H 1/00521 165/101 |
| 8,661,844 | B2* | 3/2014 | Klinkhammer | B60H 1/00685 62/419 |
| 9,683,774 | B2 | 6/2017 | Kanemaru | B60H 1/005 |
| 9,956,851 | B2* | 5/2018 | Nakamura | B60H 1/3233 |
| 10,232,679 | B2* | 3/2019 | Wiesmann | B60H 1/00685 |
| 10,434,843 | B2* | 10/2019 | Maeda | B60H 1/3233 |
| 10,800,226 | B2* | 10/2020 | Shimoyama | B60H 1/3233 |
| 11,097,591 | B2* | 8/2021 | Sikorski | B60H 1/00071 |
| 11,142,043 | B2* | 10/2021 | Sakaguchi | B60H 1/00521 |
| 2002/0117296 | A1* | 8/2002 | Smith | B60H 1/00028 165/42 |
| 2004/0093885 | A1* | 5/2004 | Ito | B60H 1/00028 62/204 |
| 2004/0182562 | A1* | 9/2004 | Smith | B60H 1/00857 165/202 |
| 2006/0065388 | A1* | 3/2006 | Newman | B60H 1/3233 165/202 |
| 2019/0047351 | A1* | 2/2019 | Shimoyama | F24F 13/22 |
| 2020/0282805 | A1* | 9/2020 | Ko | B60H 1/3233 |
| 2021/0323375 | A1* | 10/2021 | Kim | B60H 1/3228 |

FOREIGN PATENT DOCUMENTS

| | | | | |
|---|---|---|---|---|
| CN | 105291755 | B | * 1/2018 | |
| CN | 108698482 | B | * 11/2021 | B60H 1/00514 |
| DE | 19611016 | A1 | 9/1996 | B60H 1/0005 |
| DE | 19611193 | B4 | * 8/2006 | B60H 1/00664 |
| DE | 60027522 | T2 | * 9/2006 | B60H 1/00514 |
| DE | 60211349 | T2 | * 9/2006 | B60H 1/00028 |
| DE | 19611016 | B4 | * 10/2006 | B60H 1/0005 |
| DE | 60029165 | T2 | * 6/2007 | B60H 1/00028 |
| DE | 112017000982 | T5 | * 11/2018 | B60H 1/00514 |
| EP | 1101640 | A2 | * 5/2001 | B60H 1/00514 |
| EP | 1424229 | A1 | * 6/2004 | B60H 1/00028 |
| EP | 1101640 | B1 | * 4/2006 | B60H 1/00514 |
| EP | 1424229 | B1 | * 5/2006 | B60H 1/00028 |
| FR | 2875178 | A1 | * 3/2006 | B60H 1/00028 |
| FR | 3053635 | A1 | * 1/2018 | B60H 1/00064 |
| FR | 3054488 | A1 | * 2/2018 | B60H 1/00028 |
| FR | 3054489 | A1 | * 2/2018 | |
| FR | 3054490 | A1 | * 2/2018 | B60H 1/00028 |
| FR | 3053635 | B1 | * 10/2019 | B60H 1/00064 |
| GB | 2300043 | A | * 10/1996 | B60H 1/0005 |
| GB | 2328277 | A | * 2/1999 | B60H 1/00028 |
| JP | 2001150930 | A | * 6/2001 | B60H 1/00514 |
| JP | 2001150940 | A | * 6/2001 | B60H 1/00514 |
| JP | 2001206051 | A | * 7/2001 | |
| JP | 2001213142 | A | * 8/2001 | B60H 1/00514 |
| JP | 2002120539 | A | * 4/2002 | |
| JP | 2003034124 | A | * 2/2003 | B60H 1/00007 |
| JP | 2003072343 | A | * 3/2003 | B60H 1/00028 |
| JP | 3596078 | B2 | * 12/2004 | B60H 1/00664 |
| JP | 3596081 | B2 | * 12/2004 | B60H 1/0005 |
| JP | 3633893 | B2 | * 3/2005 | B60H 1/00028 |
| JP | 2006082717 | A | * 3/2006 | B60H 1/00028 |
| JP | 3926952 | B2 | * 6/2007 | B60H 1/00514 |
| JP | 4024974 | B2 | * 12/2007 | B60H 1/00514 |
| JP | 4132632 | B2 | * 8/2008 | B60H 1/00514 |
| JP | 5772709 | B2 | * 9/2015 | B60H 1/3233 |
| JP | 6281362 | B2 | * 2/2018 | B60H 1/00064 |
| JP | 6508411 | B2 | * 5/2019 | B60H 1/00514 |
| KR | 100224735 | B1 | * 10/1999 | |
| WO | WO-2018020106 | A1 | * 2/2018 | B60H 1/0005 |

* cited by examiner

PRIOR ART

PRIOR ART

PRIOR ART

AIR CONDITIONER FOR VEHICLE

CROSS-REFERENCES TO RELATED APPLICATIONS

This patent application claims priority to Korean Patent Application No. 10-2019-0025912 filed Mar. 6, 2019. The entire disclosure of the above application is incorporated herein by reference.

BACKGROUND OF THE INVENTION

Field of the Invention

The present invention relates to an air conditioner for a vehicle, and more particularly, to an air conditioner for a vehicle, which includes a drain means for discharging condensate generated from an evaporator to the outside.

Background Art

In general, an air conditioner for a vehicle is an apparatus for cooling or heating the interior of the vehicle by cooling or heating through the process of introducing outdoor air into the interior of the vehicle or circulating indoor air of the vehicle. Such an air conditioner for a vehicle includes an evaporator for cooling the inside of an air-conditioning case; a heater core for heating the inside of the air-conditioning case; and a mode converting door for selectively blowing the air cooled by the evaporator or heated by the heater core toward parts of the interior of the vehicle.

FIG. 1 is a sectional view showing a conventional air conditioner for a vehicle. As shown in FIG. 1, the conventional air conditioner 1 for a vehicle includes an air-conditioning case 10, an air blower, an evaporator 2, a heater core 3, and temp doors 18 and 19.

An air inflow port 11 is formed at an inlet of the air-conditioning case 10, a defrost vent 12, a face vent 13 and a floor vent 14 for adjusting the degree of opening by mode doors 15, 16 and 17 are formed at an outlet of the air-conditioning case 10. The air blower is connected to the air inflow port 11 of the air-conditioning case 10 to blow indoor air or outdoor air.

The evaporator 2 and the heater core 3 are mounted inside the air-conditioning case 10 in an air flow direction in order. The temp doors 18 and 19 are mounted between the evaporator 2 and the heater core 3 in order to adjust temperature of air discharged to the interior of the vehicle by adjusting the degree of opening of a cold air passageway bypassing the heater core 3 and a warm air passageway passing the heater core 3. The upper temperature adjusting door 18 is connected to a first shaft 21 and slides by rotation of the first shaft 21, and the lower temperature adjusting door 19 is connected to a second shaft 22 and slides by rotation of the second shaft 22.

FIG. 2 is an enlarged sectional view of a part "A" of FIG. 1. Referring to FIG. 2, the air-conditioning case 10 has a seating surface which is formed at a lower portion and on which the evaporator 2 is seated, a seal member 55 for keeping sealability is interposed between the air-conditioning case 10 and the evaporator 2. A bottom surface of the air-conditioning case 10 is inclined downwardly, and a drain hole 51 for discharging condensate generated from the evaporator 2 to the outside is formed at the lowermost portion of the inclined surface. Moreover, a guide rail 52 for guiding sliding of the temperature adjusting door 19 is formed on the inner surface of the air-conditioning case 10, namely, at the upstream side of the heater core 3. Another guide rail for guiding the other temperature adjusting door 18 is formed above the guide rail 52.

The conventional air conditioner for a vehicle has a groove-shaped drain channel formed in the bottom surface of the air-conditioning case 10 to smoothly discharge moisture, such as the condensate generated from the evaporator 2, to the outside. The drain channel is a passage for discharging moisture, but is weak to an air leak since the air which does not pass the evaporator 2 may flow in the drain channel as illustrated by the dotted line of FIG. 2.

In the meantime, FIG. 3 is a view showing a state where condensate exceeding a drainable amount of FIG. 2 is generated. Condensate is formed on the surface of the evaporator while the blower is operated at a relatively low stage, but too much condensate is generated when the blower is operated at a relatively high stage. So, as shown in FIG. 3, condensate exceeding a drainable amount may be generated at the lower part of the air-conditioning case 10. In this instance, when the condensate exceeding the drainable amount is generated, the condensate may overflow toward the temperature adjusting door.

SUMMARY OF THE INVENTION

Accordingly, the present invention has been made to solve the above-mentioned problems occurring in the prior arts, and it is an object of the present invention to provide an air conditioner for a vehicle which can block air introduced through a gap between an evaporator and an air-conditioning case and prevent condensate from overflowing toward a temperature adjusting door when condensate exceeding a drainable amount is generated.

To accomplish the above object, according to the present invention, there is provided an air conditioner for a vehicle, which includes an air-conditioning case having an air passageway therein, a heat exchanger disposed in the air passageway of the air-conditioning case, and a discharge part for discharging condensate, wherein a blocking member for blocking at least some of air or condensate is arranged at a predetermined area between the heat exchanger and the discharge part.

Moreover, the heat exchanger includes a cooling heat exchanger and a heating heat exchanger, a temperature adjusting door is disposed between the cooling heat exchanger and the heating heat exchanger, and the discharge part includes a drain hole, which is disposed at the downstream side of the cooling heat exchanger in an air flow direction to discharge the condensate to the outside, and the blocking member includes a first baffle protruding from the bottom surface of the air-conditioning case.

Furthermore, the first baffle is formed between the cooling heat exchanger and a seating part of the temperature adjusting door or between the cooling heat exchanger and the drain hole.

Furthermore, the blocking member gathers the condensate to perform buffering before the condensate generated from the cooling heat exchanger is discharged to the drain hole and prevents air, which does not exchange heat, from leaking between the air-conditioning case and the cooling heat exchanger seated on the air-conditioning case.

Additionally, the seating part of the temperature adjusting door is located lower than the cooling heat exchanger in the direction of gravity.

In addition, the first baffle is disposed between the cooling heat exchanger and the drain hole.

Moreover, the cooling heat exchanger includes an evaporator, and the first baffle extends from the bottom surface of the air-conditioning case to header tanks of the evaporator.

Furthermore, an upper portion of the first baffle gets in contact with the header tanks of the evaporator.

Additionally, the temperature adjusting door slides in a vertical direction, and the sliding direction of the temperature adjusting door and the extension direction of the first baffle are in parallel with each other.

In addition, the seating part is a guide rail for guiding sliding of the temperature adjusting door, and the upper end of the first baffle is formed higher than the lower end of the seating part.

Moreover, the drain hole is formed at the central portion in the width direction, and the first baffle has a slit formed at the central portion in the width direction.

Furthermore, the air conditioner further includes: a second baffle disposed at the upstream side of the slit in the air flow direction to protrude from the bottom surface of the air-conditioning case.

Additionally, a groove-shaped drain channel is formed in the bottom surface of the air-conditioning case, and the first baffle is arranged at the downstream side of the drain channel in the air flow direction.

In addition, the air conditioner further includes a third baffle disposed at the end of the drain channel to protrude from the bottom surface of the air-conditioning case, and the third baffle is arranged between the drain channel and the first baffle in the air flow direction.

Moreover, the drain hole is formed at a portion adjacent to the rear end of the slit to be opened in a side direction.

Furthermore, the air-conditioning case includes a separator for dividing the air passageway in the width direction, and the drain hole is arranged to face the separator and the slit is interposed therebetween.

Additionally, one first baffle is disposed between the drain hole and the temperature adjusting door.

In another aspect of the present invention, there is an air conditioner for a vehicle, which includes an air-conditioning case having an air passageway therein, a cooling heat exchanger disposed in the air passageway of the air-conditioning case, and a drain hole disposed at the downstream side of the cooling heat exchanger in an air flow direction to discharge condensate to the outside, further including: a first baffle protruding upwardly from the bottom surface of the air-conditioning case; and a fourth baffle protruding upwardly from the bottom surface of the air-conditioning case and formed downstream of the first baffle in the air flow direction, wherein the first baffle and the fourth baffle are formed in such a way that at least some of them are overlapped with each other in the width direction to be formed doubly in the air flow direction.

In addition, the first baffle is arranged between the cooling heat exchanger and the drain hole, and the fourth baffle is arranged downstream of the drain hole.

Moreover, the air conditioner further includes: a heating heat exchanger disposed at the downstream side of the cooling heat exchanger in the air flow direction; and a temperature adjusting door disposed between the cooling heat exchanger and the heating heat exchanger to slide in a vertical direction, wherein the fourth baffle is arranged between the drain hole and the temperature adjusting door.

Furthermore, the first baffle extends from one side of the air-conditioning case to the other side in the width direction to be spaced apart from the other side, and the fourth baffle extends from the other side of the air-conditioning case to the one side in the width direction to be spaced apart from the one side.

Additionally, the overlapped portions of the first baffle and the fourth baffle adjust horizontal and vertical temperature differences of the discharged air by adjusting the width-direction length and the height thereof.

In addition, inclined surfaces which are inclined downwardly toward the bottom surface of the air-conditioning case are respectively formed at the overlapped portions of the first baffle and the fourth baffle.

According to the present invention, the air conditioner for a vehicle can block air introduced through a gap between an evaporator and an air-conditioning case and prevent condensate from overflowing toward a temperature adjusting door when condensate exceeding a drainable amount is generated, thereby improving heat pick-up by preventing a temperature increase of discharged air, preventing malfunction of the door by the condensate, and enhancing durability.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Figure 1:
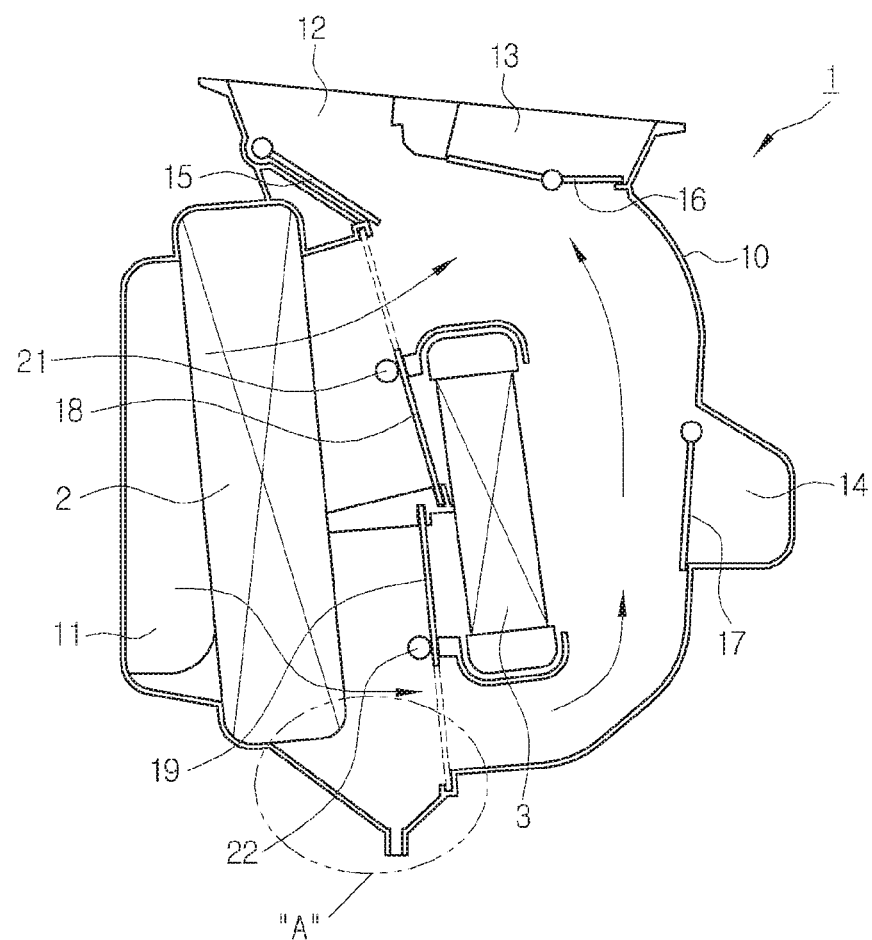
FIG. 1 is a sectional view of a conventional air conditioner for a vehicle.
Figure 2:
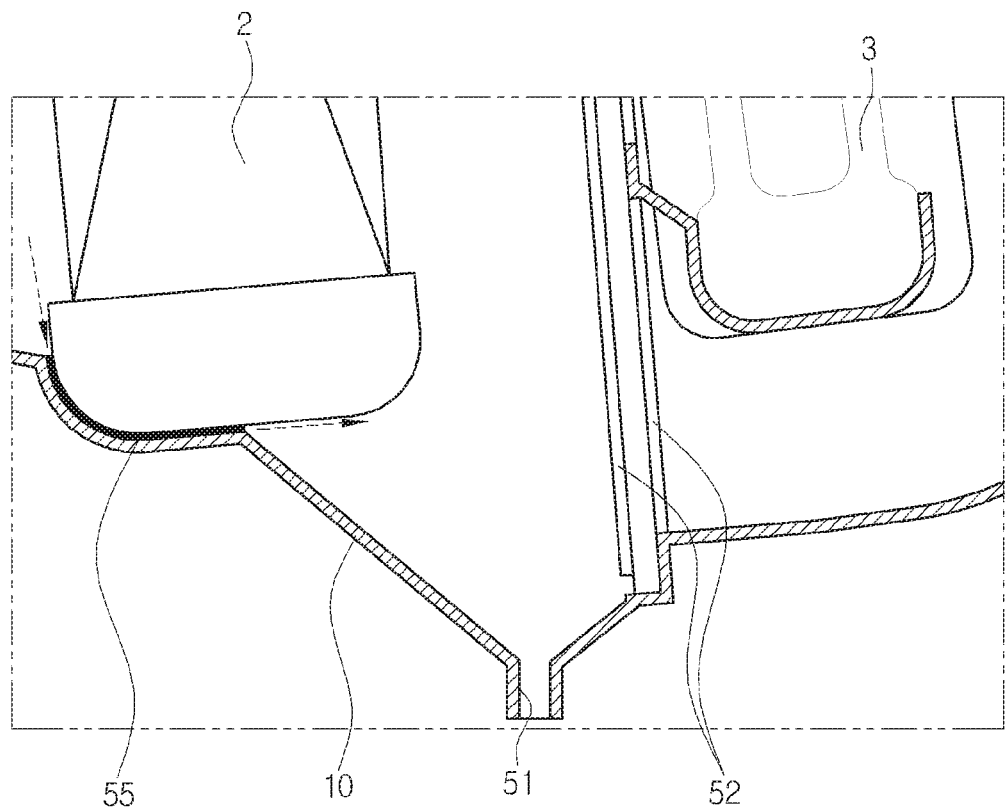
FIG. 2 is an enlarged sectional view of a part "A" of FIG. 1.
Figure 3:
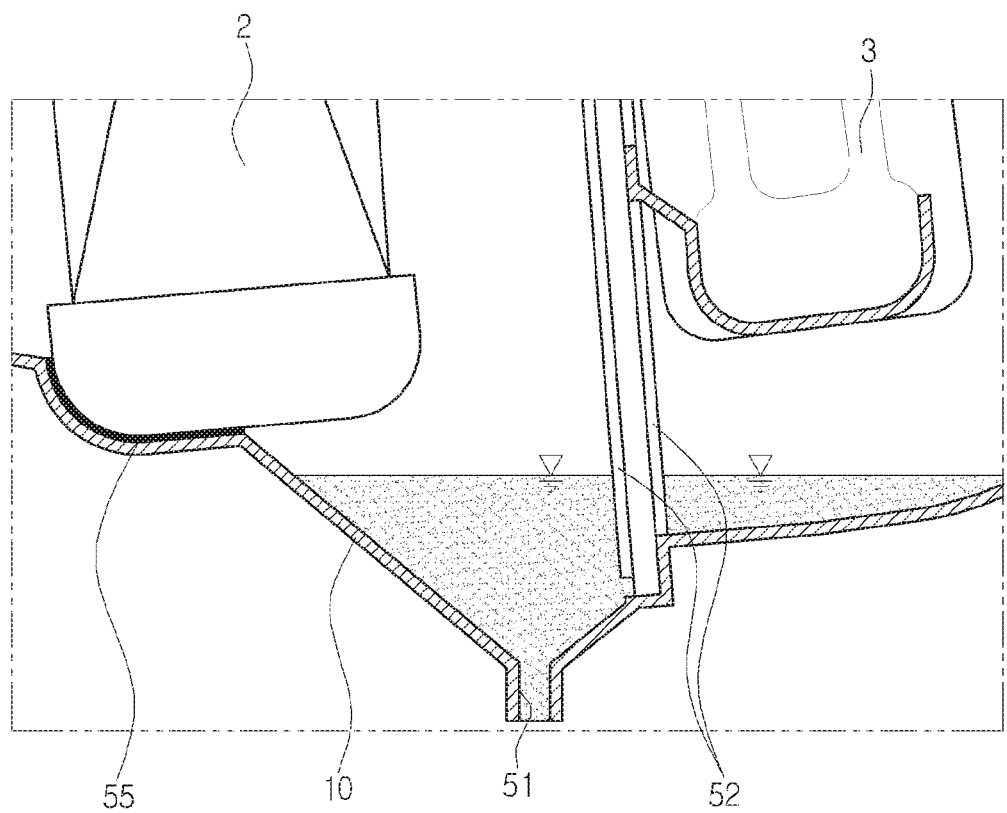
FIG. 3 is a view showing a state where condensate in excess of a drainable amount in FIG. 2 is generated.

Hereinafter, a technical structure of an air conditioner for a vehicle according to an embodiment of the present invention will be described in detail with reference to the accompanying drawings.

As shown in FIGS. 4 to 9, the air conditioner 100 for a vehicle according to the embodiment of the present invention includes an air-conditioning case 110, a blower, and temperature adjusting doors 200 and 201. An evaporator 102, which is a cooling heat exchanger, and a heater core 103, which is a heating heat exchanger, are disposed inside the air-conditioning case 110 in an air flow direction in order.

Figure 7:
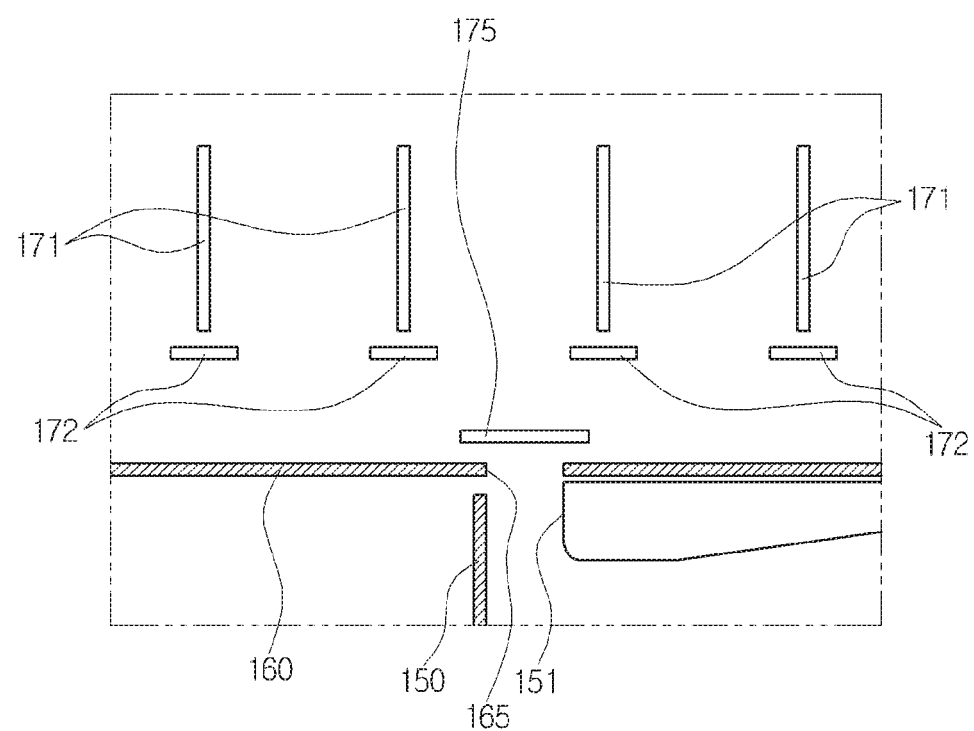
FIG. 7 is a plan view of FIG. 5.
Figure 8:
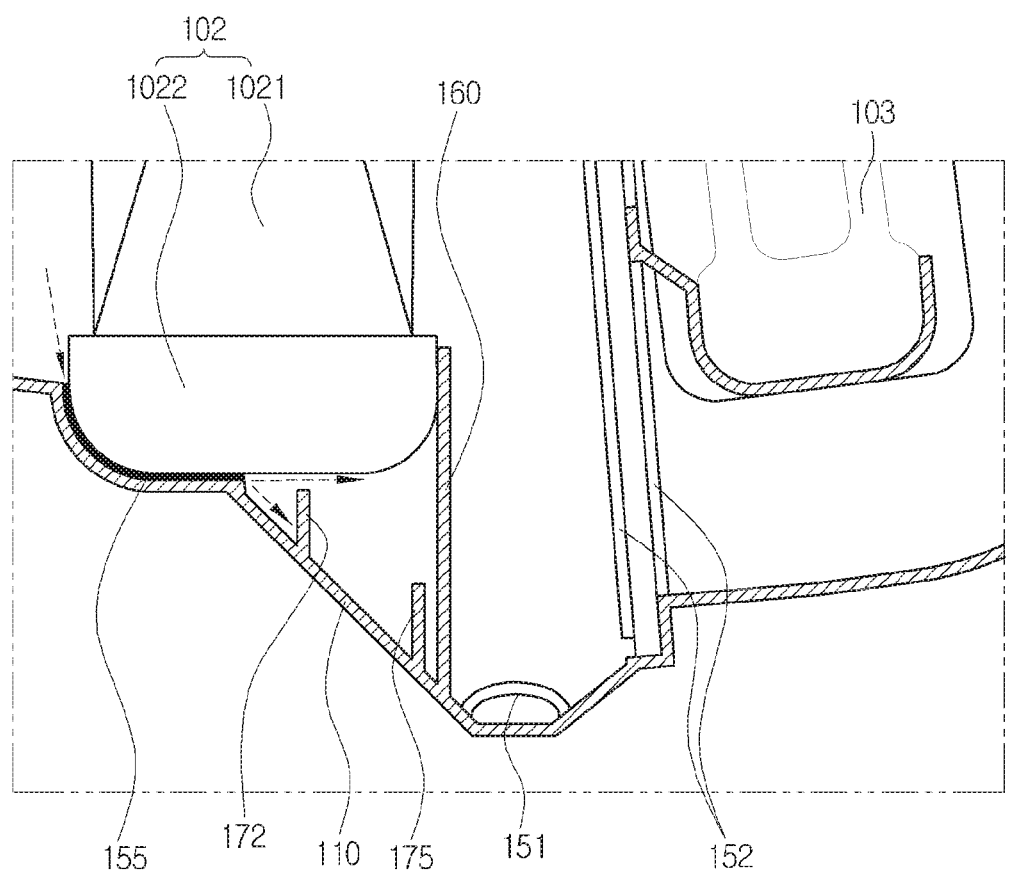
FIG. 8 is a view showing a state where a baffle blocks an air leak in FIG. 6.

In the following description, the horizontal direction of FIG. 7 is a vehicle width direction, and the vertical direction is a back-and-forth direction of the vehicle.

The air-conditioning case 110 includes an air passageway formed therein. An air inflow port 111 is formed at an inlet of the air-conditioning case 110, and a defrost vent 112, a face vent 113 and a floor vent 114 for adjusting the degree of opening by mode doors 115, 116 and 117 are formed at an outlet of the air-conditioning case 110. The blower is connected to the air inflow port 111 of the air-conditioning case 110 to blow indoor air or outdoor air.

The temperature adjusting doors 200 and 201 are mounted between the evaporator 102 and the heater core 103 in order to adjust temperature of air discharged to the interior of the vehicle by adjusting the degree of opening of a cold air passageway bypassing the heater core 103 and a warm air passageway passing through the heater core 103. The upper temperature adjusting door 200 is connected to a first shaft 121 and slides in a vertical direction by rotation of the first shaft 121, and the lower temperature adjusting door 201 is connected to a second shaft 122 and slides in the vertical direction by rotation of the second shaft 122.

The air-conditioning case 110 has a seating surface which is formed at a lower portion and on which the evaporator 102 is seated, a seal member 155 for keeping sealability is interposed between the air-conditioning case 110 and the evaporator 102. A bottom surface of the air-conditioning case 110 is inclined downwardly, and a drain hole 151 for discharging condensate generated from the evaporator 102 to the outside is formed at the lowermost portion of the inclined surface.

Moreover, a seating part 152 for guiding sliding of the temperature adjusting door 201 is formed on the inner surface of the air-conditioning case 110, namely, at the upstream side of the heater core 103. Another seating part for guiding the other temperature adjusting door 200 is formed above the seating part 152. The seating part 152 may be a guide rail for guiding sliding of the temperature adjusting door.

The drain hole 151 is disposed at the downstream side of the evaporator 102 in an air flow direction to discharge condensate to the outside. Preferably, the drain hole 151 is located at the lowermost portion of the inclined surface of the air-conditioning case 110. The drain hole 151 is formed to be opened in a side direction. Moisture generated from the evaporator 102 moves downwardly, and then, moves through the drain hole 151 in a horizontal direction to be discharged to the outside. Such a structure is effective to reduce noise when water is discharged and is advantageous for smooth drainage.

A groove-shaped drain channel 171 is formed in the bottom surface of the air-conditioning case 110. The drain channel 171 is elongated in the back-and-forth direction of the vehicle, and a plurality of the drain channels 171 are formed in the back-and-forth direction of the vehicle to be spaced apart from each other. The drain channels 171 guide condensate generated from the evaporator 102 or pipes or moisture introduced from the outside in the downward direction so that the condensate or moisture can smoothly flow to the drain hole 151.

The air-conditioning case 110 includes a blocking member. The blocking member includes a first baffle 160. In this embodiment, the first baffle 160 protrudes from the bottom surface of the air-conditioning case 110 to block the air introduced through the gap between the air-conditioning case 110 and the evaporator 102. The air-conditioning case 110 and the evaporator 102 perfectly get in contact with the seal member 155 to keep sealability. However, the air which does not pass the evaporator 102 may leak through the drain channel 171 formed for discharging the condensate.

Figure 4:
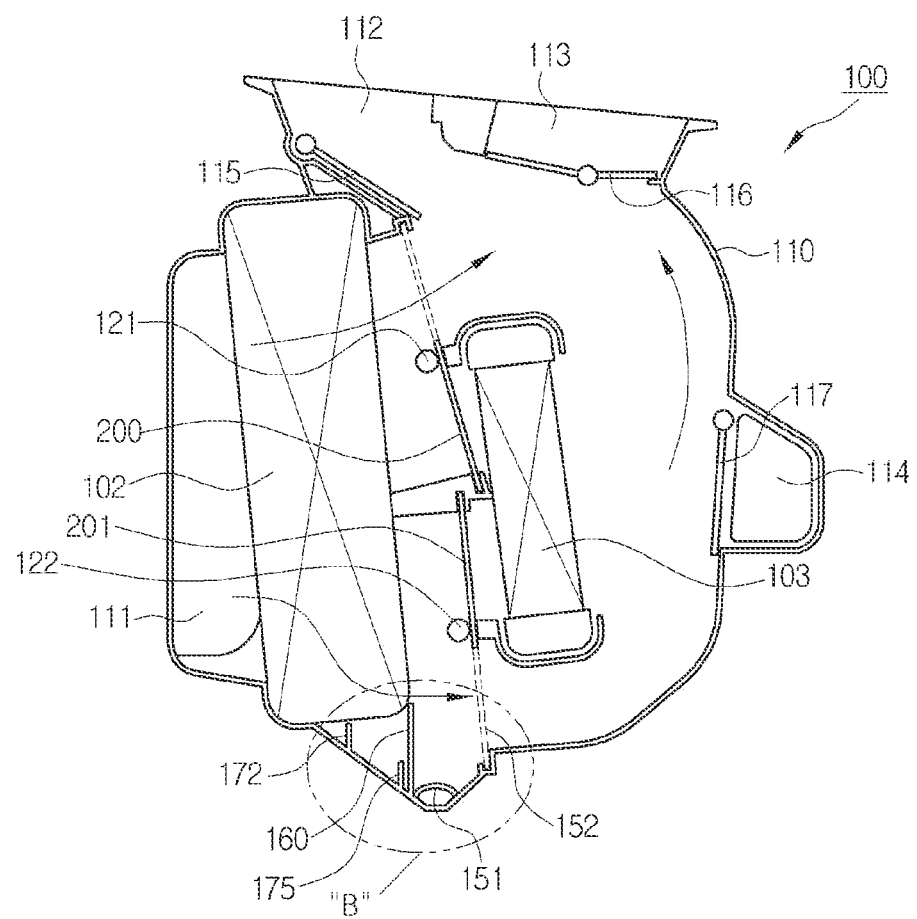
FIG. 4 is a sectional view showing an air conditioner for a vehicle according to a first embodiment of the present invention.
Figure 15:
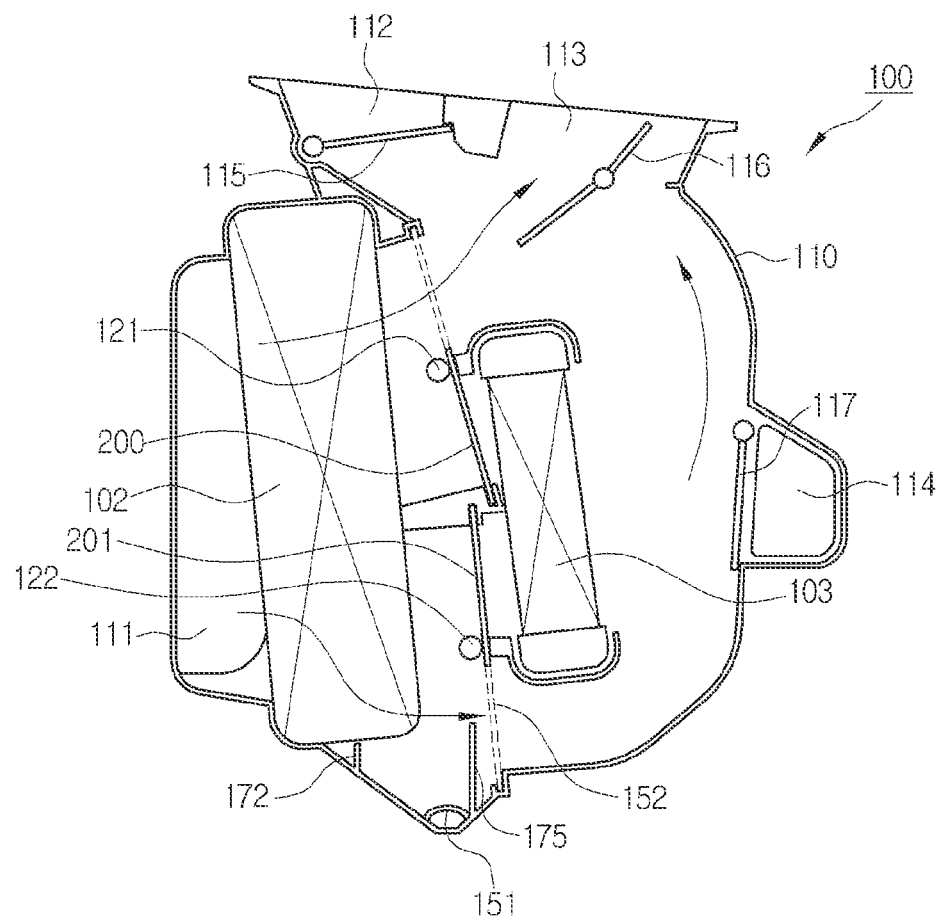
FIG. 15 is a sectional view showing an air conditioner for a vehicle according to a third embodiment of the present invention.

Meanwhile, the first baffle may be formed between the evaporator 102 and the seating part 152 of the temperature adjusting door as shown in FIG. 15, or may be formed between the evaporator 102 and the drain hole 151 as shown in FIG. 4, or may be formed between the evaporator 102 and the seating part 152 of the temperature adjusting door and between the evaporator 102 and the drain hole 151. In FIG. 15, one first baffle 160 may be formed between the drain hole 151 and the seating part 152 of the temperature adjusting door.

In this embodiment, the first baffle 160 is disposed at the downstream side of the drain channel 171 to prevent outdoor air, which does not pass the evaporator 102, from passing through the gap between the evaporator 102 and the air-conditioning case 110. Therefore, it can improve heat pick-up generated by a difference between temperature discharged to the interior of the vehicle and temperature of the evaporator. Because the discharge temperature intended by the heat ick-up is higher than the actual discharge temperature, it causes a user's dissatisfaction. However, the first baffle 160 can solve the problem.

The first baffle 160 is arranged between the evaporator 102 and the drain hole 151. Drainage capacity through the drain hole 151 varies greatly depending on the formation location of the first baffle 160. Therefore, it is very important to optimize the formation location of the first baffle 160. Through this embodiment of the present invention, the arrangement of the first baffle 160 is optimized, and it can effectively prevent water from overflowing toward the temperature adjusting door.

Figure 9:
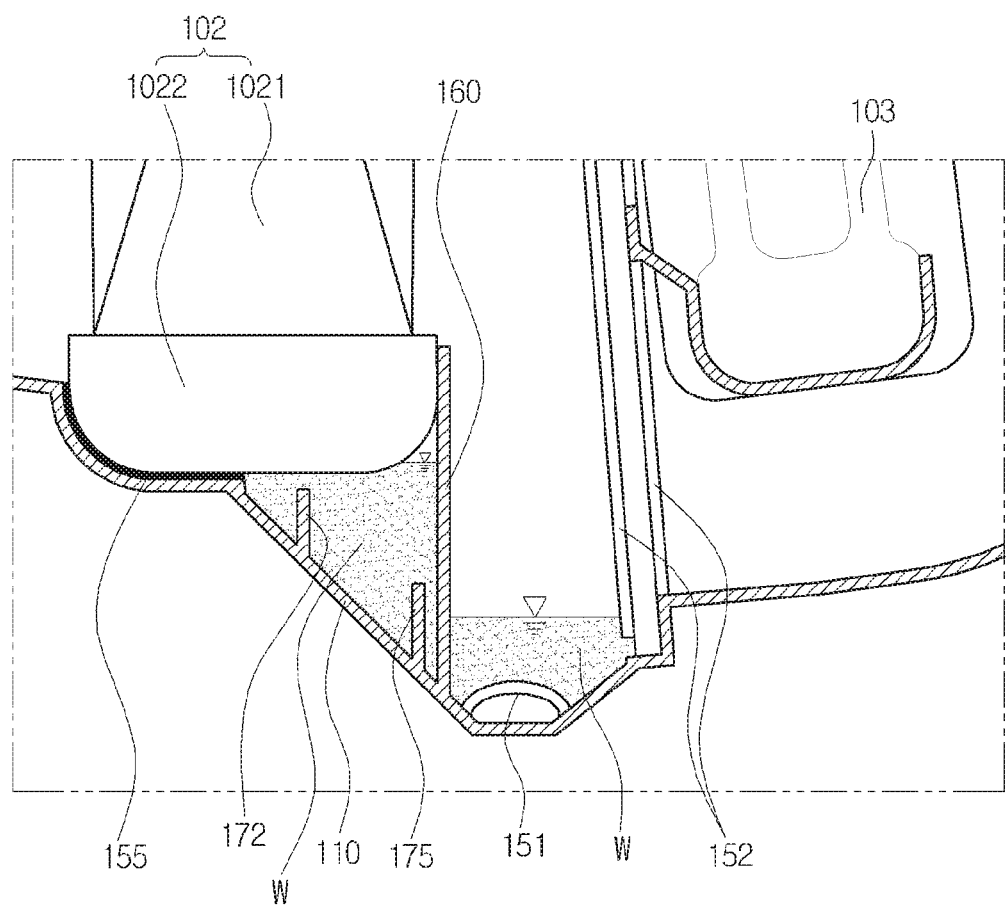
FIG. 9 is a view showing a state where condensate in excess of a drainable amount in FIG. 6 is generated.

To arrange the first baffle 160 between the evaporator 102 and the drain hole 151 means that the drain hole 151 is located behind the first baffle 160, namely, at the downstream side in the air flow direction. The first baffle 160 acts as a bulkhead between the evaporator 102 and the temperature adjusting door 201, so that the first baffle 160 first holds the condensate (W) as shown in FIG. 9 to prevent the condensate (W) moving to the drain hole 151 from overflowing toward the temperature adjusting door 201 when condensate exceeding the drainable amount is generated.

The structure that the first baffle 160 is arranged between the evaporator 102 and the drain hole 151 can prevent an air leak and an overflow of the condensate better than the structure that the baffle 160 is arranged behind the drain hole 151. That is, because the first baffle 160 is arranged in front of the drain hole 151 to be closer to the evaporator 102, it can block the air leaking between the air-conditioning case 110 and the evaporator 102 more effectively.

Furthermore, if the first baffle 160 is arranged behind the drain hole 151, when the condensate exceeding the drainable amount is generated, the first baffle 160 can prevent the condensate just a little bit from overflowing toward the temperature adjusting door 201. However, when the condensate is generated more and exceeds a predetermined water level, the first baffle 160 cannot act as the bulkhead any longer, and the condensate overflows toward the temperature adjusting door 201. The generation amount of the condensate increases, but there is a limit in a discharge amount of the condensate through the drain hole 151.

On the contrary, if the first baffle 160 is arranged between the evaporator 102 and the drain hole 151, the first baffle 160 first holds the condensate, a route of the condensate toward the drain hole 151 gets longer, and the condensate bypasses to be discharged to the drain hole 151. Therefore, even though lots of condensate is generated sharply within a short period of time, the first baffle 160 serves as a bumper to prevent the condensate from overflowing toward the temperature adjusting door 201.

The first baffle 160 extends from the bottom surface of the air-conditioning case 110 to header tanks 1022 of the evaporator 102. The evaporator 102 includes a pair of the header tanks 1022 facing each other and a plurality of tubes 1021 for connecting the header tanks 1022 with each other. When the evaporator 102 is seated on the air-conditioning case 110, in detail, the header tanks 1022 of the evaporator 102 are seated on the seating surface of the air-conditioning case 110. Additionally, an upper portion of the first baffle 160 gets in contact with the header tanks 1022 of the evaporator 102.

When the first baffle 160 extends sufficiently upwardly to the header tanks 1022 of the lower portion and gets in contact with the header tanks 1022, the condensate generated from the tubes 1021 flows down, and then, is not discharged to the drain hole 151 beyond the first baffle 160 and drops down to a space formed between the lower portion of the header tank 1022 and a front portion of the first baffle 160 to improve the overflow preventing effect more.

A sliding direction of the temperature adjusting door and an extension direction of the first baffle 160 are formed to be parallel with each other. That is, the first baffle 160 are arranged in parallel with each other or arranged nearly close to parallel. The condensate holding effect of the first baffle 160 increases relative to the same length depending on the extension direction of the first baffle 160, and even a relatively short length of the first baffle can provide the overflow preventing effect due to a limitation of a vertical package of the air-conditioning case. If the condensate overflows toward the seating part 152, the condensate may be frozen and it may interrupt actuation of the door, and the first baffle 160 can prevent it effectively.

An upper end of the first baffle 160 is formed higher than a lower end of the seating part 152. The upper end of the first baffle 160 and the lower end of the seating part 152 are all located higher than the drain hole 151. The bottom surface of the air-conditioning case 110 is inclined downwards from the evaporator 102 to the drain hole 151 so as to be the lowest at the drain hole 151 and is inclined upwards toward the heater core 103. Because the upper end of the first baffle 160 is formed higher than the lower end of the seating part 152, the first baffle 160 can sufficiently act as the bulkhead for the condensate so as to lower possibility that the condensate overflows toward the temperature adjusting door.

Figure 5:
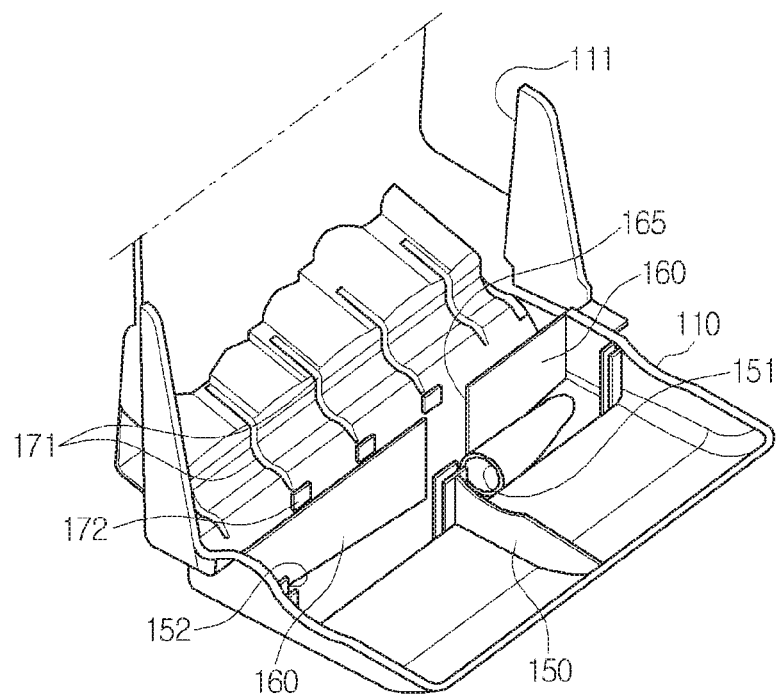
FIG. 5 is a perspective view, in a partial section, showing a floor surface of an air-conditioning case according to the embodiment of the present invention.
Figure 6:
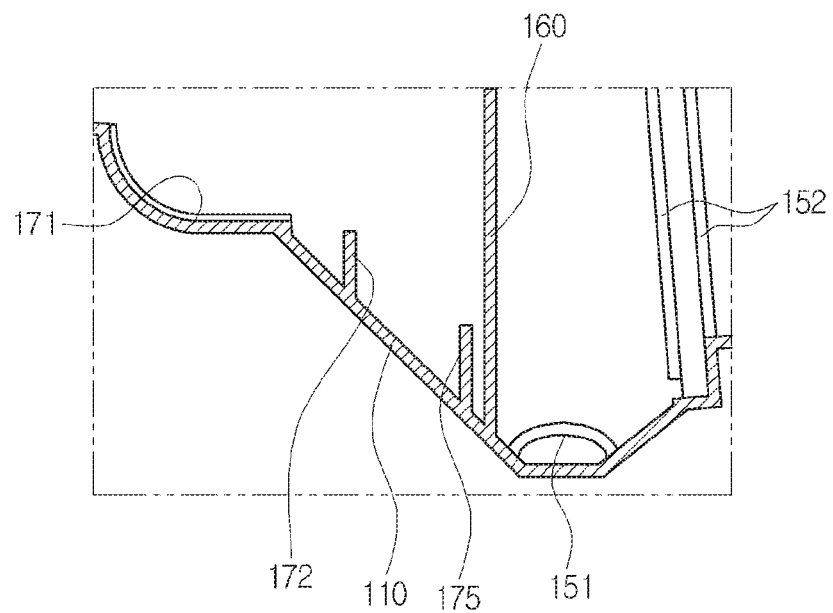
FIG. 6 is an enlarged sectional view of a part "B" of FIG. 4.

As shown in FIGS. 5 and 7, the drain hole 151 is formed approximately at the central portion in the width direction of the vehicle. Moreover, the first baffle 160 has a slit 165 formed at the central portion in the width direction of the vehicle. In FIG. 7, the upward direction is the upstream side and the downward direction is the downstream side in the air flow direction. In FIG. 7, the condensate flows downwards from the upper portion. The bottom surface of the air-conditioning case 110 is inclined toward the drain hole 151 in the back-and-forth direction of the vehicle, and is also inclined in the width direction of the vehicle.

The drain hole 151 is formed to be opened at a portion adjacent to the rear end of the slit 165 in the side direction. Additionally, the air-conditioning case 110 includes a separator 150 for partitioning the air passageway in the width direction of the vehicle. The separator 150 divides the air passageway inside the air-conditioning case 110 into right and left in the width direction of the vehicle. The drain hole 151 is arranged to face the separator 150 and the separator 150 is interposed therebetween.

The condensate generated from the evaporator 102 drops down to the bottom surface of the air-conditioning case 110, and then, flows toward the drain hole 151 in the back-and-forth direction of the vehicle and toward the drain hole 151 in the width direction of the vehicle. When the generated condensate is blocked by the first baffle 160 and exceeds the predetermined water level, the condensate runs over the first baffle 160 in the height direction and is discharged to the drain hole 151. However, most of the condensate flows in the width direction of the vehicle and is gathered at the central portion, and is discharged to the drain hole 151 through the slit 165. It is also possible that the condensate bypasses through the slit 165 and is discharged to the drain hole 151.

Moreover, the air-conditioning case 110 includes a second baffle 175 and a third baffle 172. The second baffle 175 is arranged at the upstream side of the slit 165 in the air flow direction, and protrudes from the bottom surface of the air-conditioning case 110. The third baffle 172 is arranged at the end of the drain channel 171, and protrudes from the bottom surface of the air-conditioning case 110. The first baffle 160 is arranged at the downstream side of the drain channel 171 in the air flow direction. Furthermore, the third baffle 172 is arranged between the drain channel 171 and the first baffle 160 in the air flow direction.

The second baffle 175 is located in front of the slit 165 to prevent the condensate from being directly discharged to the drain hole 151 through the slit 165. That is, the second baffle 175 bypasses the condensate and makes a discharge route longer so as to doubly prevent overflow of the condensate together with the first baffle 160. The third baffle 172 is formed at the end of the drain channel 171 to block the air leaking through the drain channel 171 at the foremost part. The present invention can prevent air leak more effectively through the third baffle 172.

Figure 10:
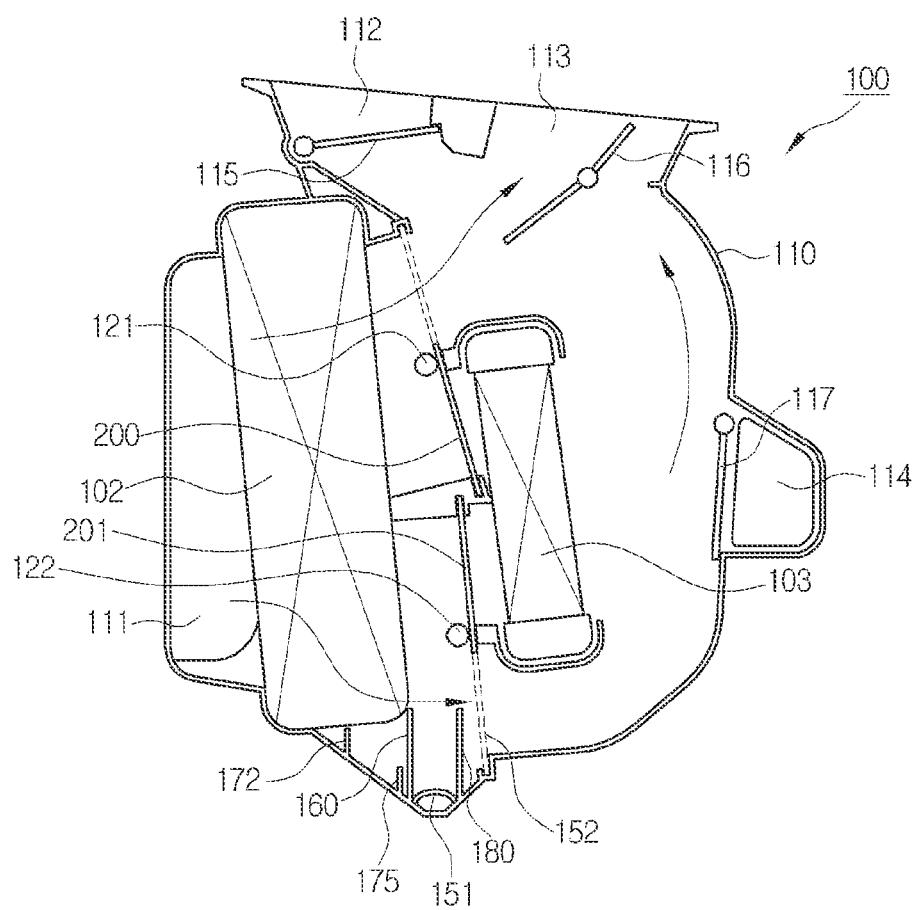
FIG. 10 is a sectional view of an air conditioner for a vehicle according to a second embodiment of the present invention.
Figure 11:
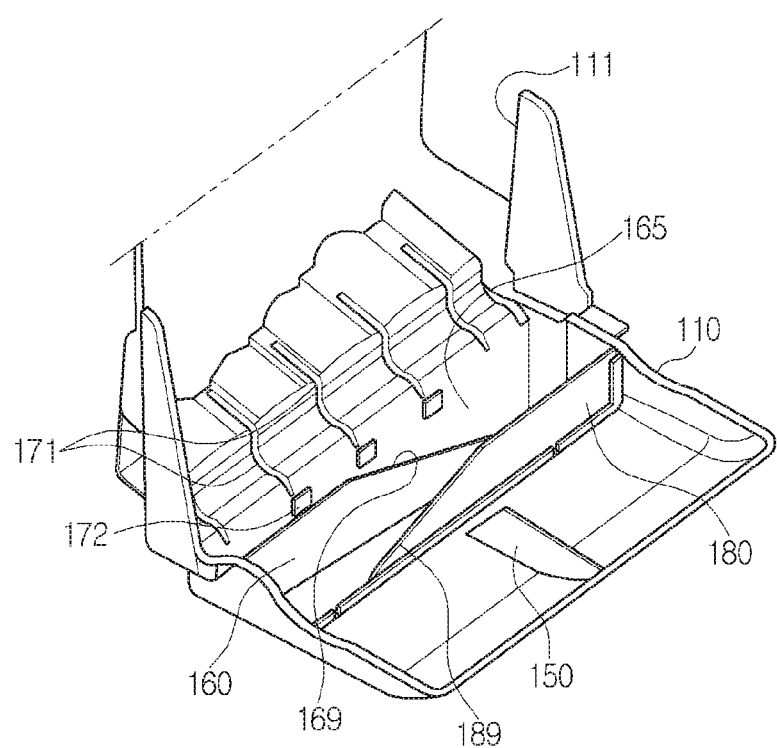
FIG. 11 is a perspective view, in a partial section, showing a floor surface of an air-conditioning case according to the second embodiment of the present invention.
Figure 12:
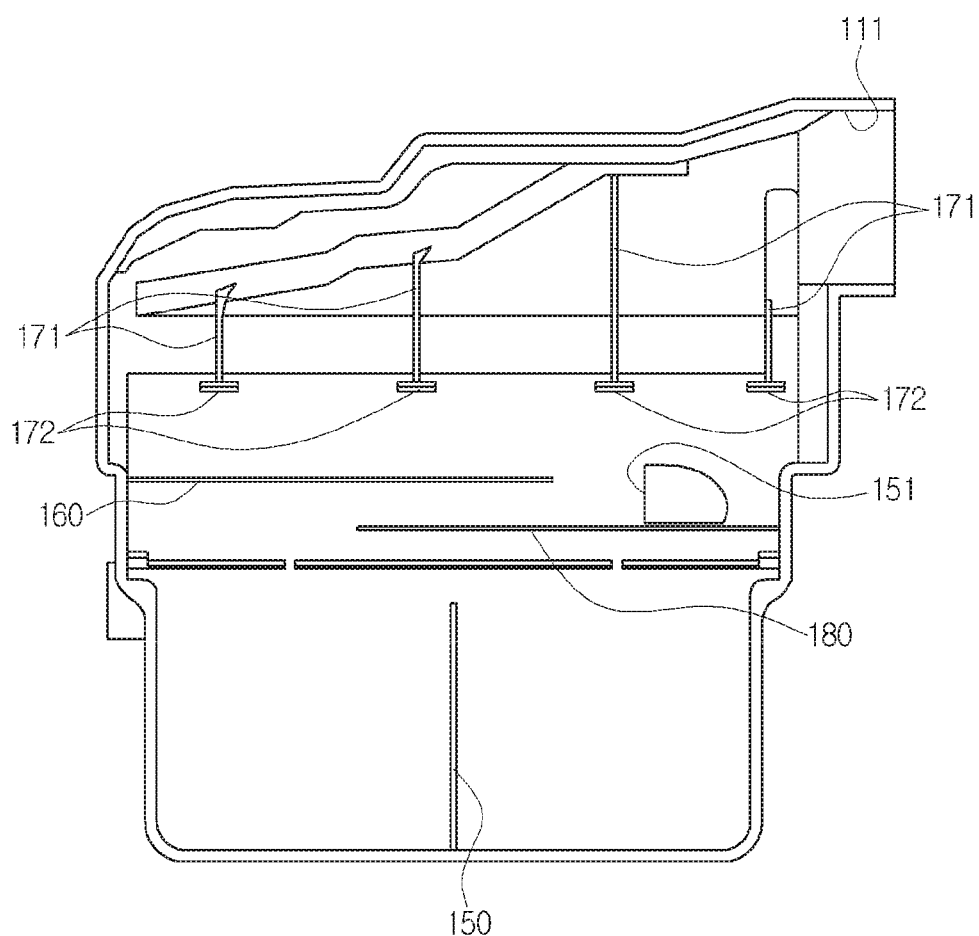
FIG. 12 is a plan view of FIG. 11.
Figure 13:
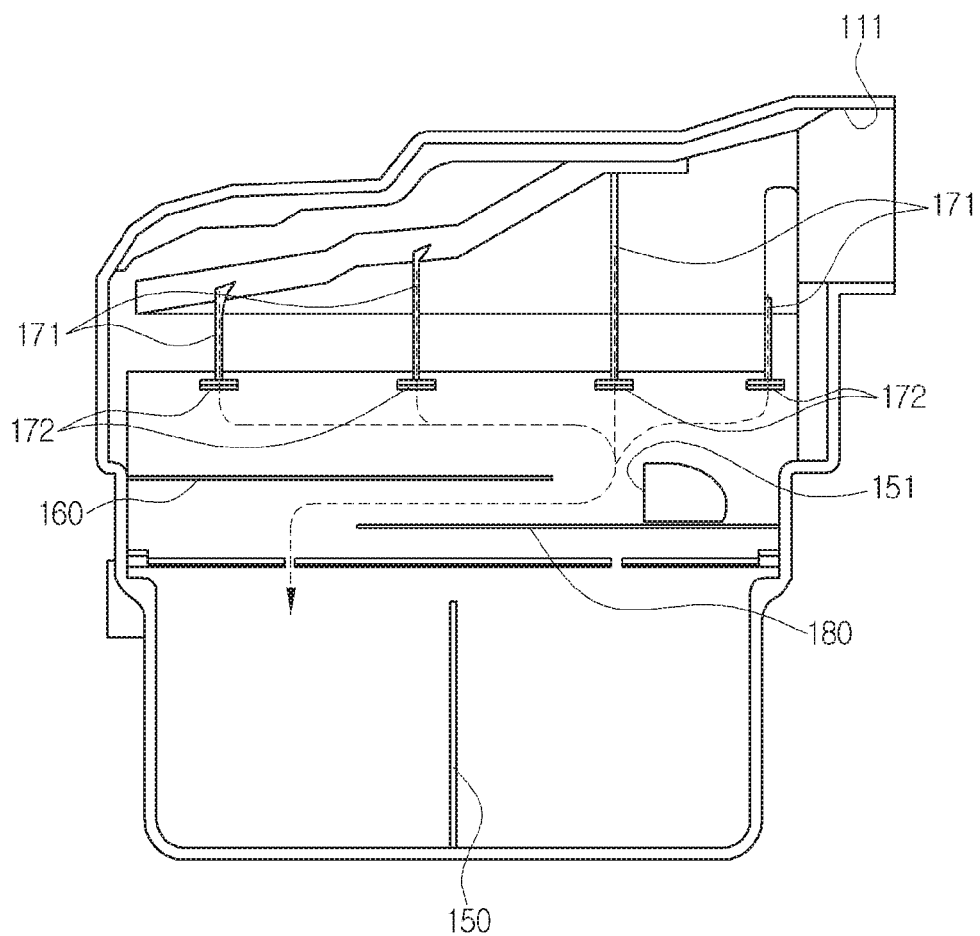
FIG. 13 is a view showing an air movement route of FIG. 12.
Figure 14:
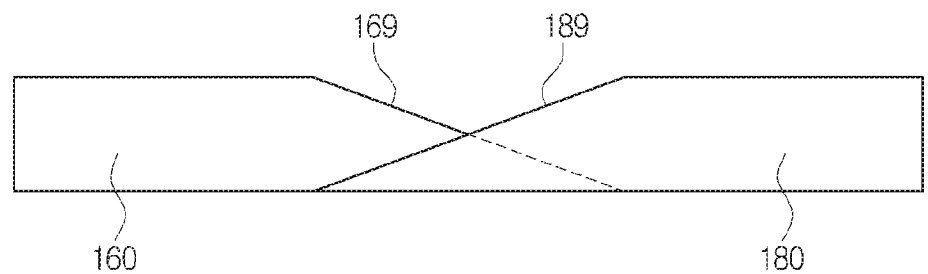
FIG. 14 is a front view of a first baffle and a fourth baffle of FIG. 11.

Meanwhile, FIG. 10 is a sectional view of an air conditioner for a vehicle according to a second embodiment of the present invention, FIG. 11 is a perspective view, in a partial section, showing a floor surface of an air-conditioning case according to the second embodiment of the present invention, FIG. 12 is a plan view of FIG. 11, FIG. 13 is a view showing an air movement route of FIG. 12, and FIG. 14 is a front view of a first baffle and a fourth baffle of FIG. 11.

Referring to FIGS. 10 to 14, the air conditioner 100 for a vehicle according to the second embodiment of the present invention includes an air-conditioning case 110, a blower, and temperature adjusting doors 200 and 201. The air-conditioning case 110 has an evaporator 102 and a heater core 103 which are disposed in order in the air flow direction. In this embodiment, only parts different from those of the first embodiment will be described in detail.

Hereinafter, the horizontal direction of FIG. 12 is a vehicle width direction, and the vertical direction is a back-and-forth direction of the vehicle.

A drain hole 151 is disposed at the downstream side of the evaporator 102 in the air flow direction to discharge condensate to the outside, and is formed to be opened in the side direction. The air-conditioning case 110 has a groove-shaped drain channel 171 formed in the bottom surface thereof. A plurality of the drain channels 171 are elongated in the back-and-forth direction of the vehicle to be spaced apart from each other in the width direction of the vehicle.

The air-conditioning case 110 includes a first baffle 160 and a fourth baffle 180. The first baffle 160 protrudes from the bottom surface of the air-conditioning case 110 to block the air introduced through a gap between the air-conditioning case 110 and the evaporator 102. Air which does not pass through the evaporator 102 may leak through the drain channel 171 formed between the air-conditioning case 110 and the evaporator 102.

The fourth baffle 180 protrudes upwards from the bottom surface of the air-conditioning case 110, and is formed downstream of the first baffle 160 in the air flow direction. The first baffle 160 and the fourth baffle 180 are formed in such a way that at least some of them are overlapped with each other in the width direction, and are formed doubly in the air flow direction. Through the above structure, the air-conditioning case 110, the first baffle 160 and the fourth baffle 180 form a drain channel in zigzags.

The first baffle 160 is arranged between the evaporator 102 and the drain hole 151. Additionally, the fourth baffle 180 is arranged downstream of the drain hole 151. In more detail, the fourth baffle 180 is arranged between the drain hole 151 and the temperature adjusting door. Drainage capacity through the drain hole 151 varies greatly depending on the formation location of the first baffle 160 and the fourth baffle 180. Therefore, it is very important to optimize the formation location of the first baffle 160 and the fourth baffle 180. Through this embodiment of the present invention, the arrangement of the first baffle 160 and the fourth baffle 180 is optimized, and it can effectively prevent water from overflowing toward the temperature adjusting door.

To arrange the first baffle 160 between the evaporator 102 and the drain hole 151 means that the drain hole 151 is located behind the first baffle 160, namely, downstream in the air flow direction. The first baffle 160 acts as a bulkhead between the evaporator 102 and the temperature adjusting door.

Moreover, the fourth baffle 180 is arranged between the drain hole 151 and the temperature adjusting door to doubly block the condensate, reduce overflow of the condensate by making the condensate bypass without being directly discharged to the drain hole 151, and improve mixability between cold air and warm air by making leaking air bypass without directly moving downwards.

The first baffle 160 extends from one side of the air-conditioning case 110 to the other side in the width direction to be spaced apart from the other side. The fourth baffle 180 extends from the other side of the air-conditioning case 110 to the one side in the width direction to be spaced apart from the one side.

As described above, the air conditioner for a vehicle according to the second embodiment of the present invention can reduce horizontal and vertical temperature differences of the discharged air, since the lower end drain path of the air-conditioning case 110 is blocked doubly and hot air leaking through the drain channel 171 formed between the evaporator 102 and the air-conditioning case 110 is induced to move along evaporator tanks and the surface of the evaporator or hot air and cold air passing along the zigzag drain channel are sufficiently mixed. Moreover, the condensate generated from the evaporator 102 bypasses through the first baffle 160 and the fourth baffle 180 and moves downwards so as to enhance the bulkhead function.

The overlapped portions of the first baffle 160 and the fourth baffle 180 can adjust the horizontal and vertical temperature differences of the discharged air by adjusting the width-direction length and the height thereof. For instance, if the width-direction length of the overlapped portions of the first baffle 160 and the fourth baffle 180 gets longer, because the bypass route of the leaking air gets longer and the hot air is mixed with the cold air while staying longer, mixability is enhanced.

Downwardly inclined surfaces 169 and 189 are respectively formed at the overlapped portions of the first baffle 160 and the fourth baffle 180 toward the bottom surface of the air-conditioning case 110. The inclined surface 169 formed on the first baffle 160 is inclined downwardly from one side to the other side in the width direction, and the inclined surface 189 formed on the fourth baffle 180 is inclined downwardly from the other side to the one side in the width direction. Through the above structure, the inclined surface 169 of the first baffle 160 and the inclined surface 189 of the fourth baffle 180 are formed in a "V" shape in the front view of FIG. 14.

The air conditioner for a vehicle according to the present invention can increase air volume toward the center by inducing an air flow in the direction of the center through the "V" shaped groove formed by the inclined surface 169 of the first baffle 160 and the inclined surface 189 of the fourth baffle 180. If a side vent for discharging air between the left and the right in the width direction of the vehicle is connected to the center of the air outflow port, the air volume of the side vent can be increased.

To sum up, the air conditioner for a vehicle can prevent the condensate passing through the drain path at the lower portion of the evaporator tank from spattering or being discharged through the outlet due to the double structure of the first baffle 160 and the fourth baffle 180, and can make the horizontal and vertical temperature differences by the leaking air passing through the drain path uniform. Furthermore, the air conditioner for a vehicle can partially prevent thermal loss due to increase of vent discharge temperature due to the double resistor function.

While the present invention has been particularly shown and described with reference to exemplary embodiments thereof, it will be understood by those of ordinary skill in the art that various modifications and equivalents may be made without deviating from the spirit or scope of the invention. Therefore, it would be understood that the technical and protective scope of the present invention shall be defined by the technical idea as defined by the following claims and the equivalences.

What is claimed is:
1. An air conditioner for a vehicle, comprising:
an air-conditioning case having an inlet and at least one outlet and defining an air passageway extending between the inlet and the at least one outlet in a downstream direction;
a cooling heat exchanger and a heating heat exchanger disposed in the air passageway of the air-conditioning case;
a discharge part for discharging condensate;
a blocking member arranged between the cooling heat exchanger and the discharge part, the blocking member for blocking at least some of air or condensate;
a temperature adjusting door disposed between the cooling heat exchanger and the heating heat exchanger relative to the downstream direction;
the discharge part including a drain hole disposed downstream of the cooling heat exchanger relative to the downstream direction to discharge the condensate to the outside; and the blocking member including a first baffle protruding from a bottom surface of the air-conditioning case and located upstream of the drain hole relative to the downstream direction, the first baffle configured to prevent air from leaking between the air-conditioning case and the cooling heat exchanger seated on the air-conditioning case.

2. The air conditioner according to claim 1, wherein the first baffle is formed between the cooling heat exchanger and a seating part of the temperature adjusting door relative to the downstream direction, or between the cooling heat exchanger and the drain hole relative to the downstream direction.

3. The air conditioner according to claim 2, wherein the seating part of the temperature adjusting door is located lower than the cooling heat exchanger in a direction of gravity.

4. The air conditioner according to claim 2, wherein the cooling heat exchanger includes an evaporator, wherein the evaporator includes a pair of header tanks at a bottom of the evaporator, and wherein the first baffle extends from the bottom surface of the air-conditioning case into engagement with the header tanks of the evaporator.

5. The air conditioner according to claim 2, wherein at least one groove-shaped drain channel is formed in the bottom surface of the air-conditioning case, and the first baffle is arranged downstream of the drain channel relative to the downstream direction.

6. The air conditioner according to claim 5, wherein the blocking member further includes a third baffle disposed at an end of the at least one drain channel to protrude from the bottom surface of the air-conditioning case, wherein the third baffle is arranged between the at least one drain channel and the first baffle relative to the downstream direction.

7. The air conditioner according to claim 2, further including another baffle disposed between the drain hole and the temperature adjusting door relative to the downstream direction.

8. An air conditioner for a vehicle, comprising:
an air-conditioning case having an inlet and an outlet and defining an air passageway extending between the inlet and at least one outlet in a downstream direction;
a cooling heat exchanger and a heating heat exchanger disposed in the air passageway of the air-conditioning case;
a blocking member for blocking at least some of air or condensate arranged between the cooling heat exchanger and the discharge part relative to the downstream direction;
a temperature adjusting door disposed between the cooling heat exchanger and the heating heat exchanger relative to the downstream direction;
the air-conditioning case defining a drain hole at the downstream side of the cooling heat exchanger relative to the downstream direction to discharge condensate from the cooling heat exchanger to outside of the air-conditioning case;
a temperature adjusting door disposed between the cooling heat exchanger and the heating heat exchanger relative to the downstream direction;
wherein the blocking member includes a first baffle protruding from a bottom surface of the air-conditioning case and located between the cooling heat exchanger and a seating part of the temperature adjusting door relative to the downstream direction, or between the cooling heat exchanger and the drain hole relative to the downstream direction; and
wherein the first baffle further extends in a width direction of the vehicle.

9. The air conditioner according to claim 8, wherein the seating part is a guide rail for guiding sliding of the temperature adjusting door, and
wherein the upper end of the first baffle is formed higher than a lower end of the seating part.

10. An air conditioner for a vehicle, comprising:
an air-conditioning case having an inlet and at least one outlet and defining an air passageway extending between the inlet and the at least one outlet in a downstream direction;
a cooling heat exchanger and a heating heat exchanger disposed in the air passageway of the air-conditioning case;
a discharge part for discharging condensate from the cooling heat exchanger;
a blocking member for blocking at least some of air or condensate arranged between the heat exchanger and the discharge part relative to the downstream direction;
a temperature adjusting door disposed between the cooling heat exchanger and the heating heat exchanger relative to the downstream direction;
the discharge part including a drain hole disposed at a downstream side of the cooling heat exchanger in the downstream direction for discharging the condensate outside of the air-conditioning case;
a temperature adjusting door disposed between the cooling heat exchanger and the heating heat exchanger relative to the downstream direction, the temperature adjusting door including a seating part at a bottom of the temperature adjusting door;
the blocking member including a first baffle protruding from the bottom surface of the air-conditioning case, and formed between the cooling heat exchanger and the seating part of the temperature adjusting door relative to the downstream direction, or between the cooling heat exchanger and the drain hole; and
wherein the air-conditioning case extends between a pair of side walls in a width direction of the vehicle;
wherein the drain hole is formed at a central portion of the air conditioning case in the width direction;
wherein the first baffle defines a slit aligned with the drainhole in the width direction.

11. The air conditioner according to claim 10,
wherein the blocking member further includes a second baffle disposed at an upstream side of the slit relative to the downstream direction to protrude from the bottom surface of the air-conditioning case.

12. The air conditioner according to claim 10, wherein the drain hole is formed to open in the width direction of the vehicle adjacent to an end of the slit.

13. The air conditioner according to claim 12, wherein the air-conditioning case includes a separator for dividing the air passageway in the width direction, and
wherein the drain hole is arranged to face the separator, and the slit is interposed between the drain hole and the separator.

* * * * *